United States Patent
Knecht et al.

(10) Patent No.: US 10,533,459 B1
(45) Date of Patent: Jan. 14, 2020

(54) SLOW TURNING GEAR ADAPTER TO ELIMINATE TURBINE BUCKET WEAR

(71) Applicants: Kenneth Knecht, Chugiak, AK (US); Paul Tucker, Huffman, TX (US)

(72) Inventors: Kenneth Knecht, Chugiak, AK (US); Paul Tucker, Huffman, TX (US)

(*) Notice: Subject to any disclaimer, the term of this patent is extended or adjusted under 35 U.S.C. 154(b) by 145 days.

(21) Appl. No.: 15/643,359

(22) Filed: Jul. 6, 2017

Related U.S. Application Data (60) Provisional application No. 62/359,610, filed on Jul. 7, 2016.

(51) Int. Cl.
- F01D 25/36 (2006.01)
- F01D 15/12 (2006.01)
- F01D 5/02 (2006.01)

(52) U.S. Cl.
CPC ........... F01D 25/36 (2013.01); F01D 5/02 (2013.01); F01D 15/12 (2013.01); F05D 2220/70 (2013.01); F05D 2240/60 (2013.01); F05D 2260/4023 (2013.01); F05D 2270/02 (2013.01); F05D 2270/303 (2013.01)

(58) Field of Classification Search
CPC . F01D 5/02; F01D 25/36; F01D 15/12; F05D 2240/60; F05D 2260/4023; F05D 2270/02; F05D 2270/303; F02C 7/275
See application file for complete search history.

(56) References Cited

U.S. PATENT DOCUMENTS

| | | | | |
|---|---|---|---|---|
| 2,860,713 A * | 11/1958 | Peterson | .............. | B64D 35/00 192/103 R |
| 3,793,905 A * | 2/1974 | Black | .............. | F01D 25/34 60/788 |
| 4,051,679 A * | 10/1977 | Collin | .............. | B63H 23/08 192/218 |
| 4,170,905 A * | 10/1979 | Collin | .............. | B63H 23/16 74/355 |
| 4,271,940 A * | 6/1981 | Collin | .............. | B63H 23/08 192/221 |
| 4,384,639 A * | 5/1983 | Collin | .............. | B63H 23/08 192/218 |
| 5,249,666 A * | 10/1993 | Gorski | .............. | F16D 41/064 188/82.84 |
| 9,121,309 B2 * | 9/2015 | Geiger | .............. | F01D 21/06 |
| 9,664,070 B1 * | 5/2017 | Clauson | .............. | F01D 25/36 |
| 10,125,636 B2 * | 11/2018 | Dube | .............. | F02C 3/04 |
| 2012/0329593 A1 * | 12/2012 | Larrabee | .............. | B64C 39/024 475/5 |
| 2016/0230771 A1 * | 8/2016 | Dobat | .............. | F01D 5/02 |

* cited by examiner

*Primary Examiner* — David R Morris
(74) *Attorney, Agent, or Firm* — Christensen O'Connor Johnson Kindness PLLC (57) ABSTRACT

A turbine and the method of operating the turbine when taking the turbine off-line includes transmitting power to a No. 1 shaft via a main motor to turn the turbine at an original turning speed, wherein the No. 1 shaft drives a No. 2 shaft; reducing a speed of the turbine; and when the speed of the turbine is reduced to a predetermined RPM, switching power transmission to the turbine from the No. 1 shaft to a No. 2 shaft, wherein the No. 2 shaft is driven by an auxiliary motor, and the No. 2 shaft drives the No. 1 shaft to turn the turbine at a slow turning speed less than the original turning speed.

21 Claims, 9 Drawing Sheets

SLOW TURNING GEAR ADAPTER TO ELIMINATE TURBINE BUCKET WEAR

CROSS-REFERENCE TO RELATED APPLICATION

This application claims the benefit of U.S. Provisional Application No. 62/359,610, filed Jul. 7, 2016, which is incorporated herein by reference in its entirety.

BACKGROUND

Heavy industrial turbines, such as are used in the generation of electricity using steam, are susceptible to damage during cooling down after operation. Therefore, when the turbine needs to be taken off-line, a motor and turning gear are engaged to keep the turbine rotor turning at about 40 to 45 RPM (revolutions per minute) while the turbine unit cools down. The turning of the shaft and wheels during the cool-down period is helpful to prevent bowing of the rotor due to uneven cooling. However, even after the turbine has cooled down, the turning gear is sometimes engaged to prevent the rotor from deforming under its own weight, which could cause an imbalance and high vibrations on re-start of the turbine. However, prolonged operation of the turning gear could also cause turbine wheel dovetail damage due to bucket rocking. The rocking motion can also cause the buckets to wear prematurely at their Z-notch at the bucket root. To reduce bucket damage, the turbine rotor could be stopped completely. However, this solution is not desirable either because the turbine rotor will need a longer start-up period to remove the rotors' sag than if the turning gear was left running. Accordingly, persons responsible for maintaining and operating turbines are faced with either the possibility of premature bucket damage due to prolonged operation of the turning gear or longer turbine start-up periods. Accordingly, another solution is necessary to minimize or eliminate damage due to bucket rocking that would also allow for a quick start-up of the turbine.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of operating a turbine when taking the turbine off-line includes transmitting power to a No. 1 shaft via a main motor to turn the turbine at an original turning speed, wherein the No. 1 shaft drives a No. 2 shaft; reducing a speed of the turbine; and when the speed of the turbine is reduced to a predetermined RPM, switching power transmission to the turbine from the No. 1 shaft to a No. 2 shaft, wherein the No. 2 shaft is driven by an auxiliary motor, and the No. 2 shaft drives the No. 1 shaft to turn the turbine at a slow turning speed less than the original turning speed.

In some embodiments, the original turning speed is greater than 40 RPM, and the slow turning gear speed is less than 10 RPM.

In some embodiments, the original turning speed is used during cool down of a turbine shaft, and the slow turning speed is used after the turbine shaft has cooled down.

In some embodiments, the method further comprises engaging a clutch to transmit power from the auxiliary motor to the No. 2 shaft.

In some embodiments, the method further comprises turning off the main motor to reduce the turbine speed before the clutch is engaged.

In some embodiments, the method further comprises, after that turbine has been running at the slow turning speed, increasing the speed of the turbine, and when the speed of the turbine is increased to a predetermined RPM, switching power transmission to the turbine from the No. 2 shaft to the No. 1 shaft.

In some embodiments, the method further comprises disengaging the clutch upon reaching the predetermined RPM.

In some embodiments, the method further comprises turning on the main motor to increase the speed of the turbine.

In some embodiments, the method further comprises, upon reaching a predetermined time of running the turbine at the original turning speed, switching power transmission from the No. 1 shaft to the No. 2 shaft.

In some embodiments, the method further comprises, upon reaching a predetermined turbine temperature while running the turbine at the original turning speed, switching power transmission from the No. 1 shaft to the No. 2 shaft.

In some embodiments, the No. 1 shaft and the No. 2 shaft are located within an accessory gear box.

In some embodiments, the No. 1 shaft comprises a set of helical gears and the No. 2 shaft comprises a set of helical gears, wherein the helical gears of the No. 1 shaft are intermeshed with the helical gears of the No. 2 shaft.

In some embodiments, a turbine system includes a turbine connected to a No. 1 shaft, wherein the No. 1 shaft is connected to a main motor through a torque converter; an accessory gear box containing the No. 1 shaft and the No. 2 shaft, wherein the No. 1 shaft comprises a set of helical gears and the No. 2 shaft comprises a set of helical gears, wherein the helical gears of the No. 1 shaft are intermeshed with the helical gears of the No. 2 shaft; and an auxiliary motor connected to the No. 2 shaft through a slow turning gear adapter and clutch.

In some embodiments, the clutch is engaged at a turbine speed of 10 RPM or less.

In some embodiments, the clutch is engaged at a turbine speed of 5 RPM or less.

In some embodiments, the clutch is engaged at a turbine speed of 5 RPM or less.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
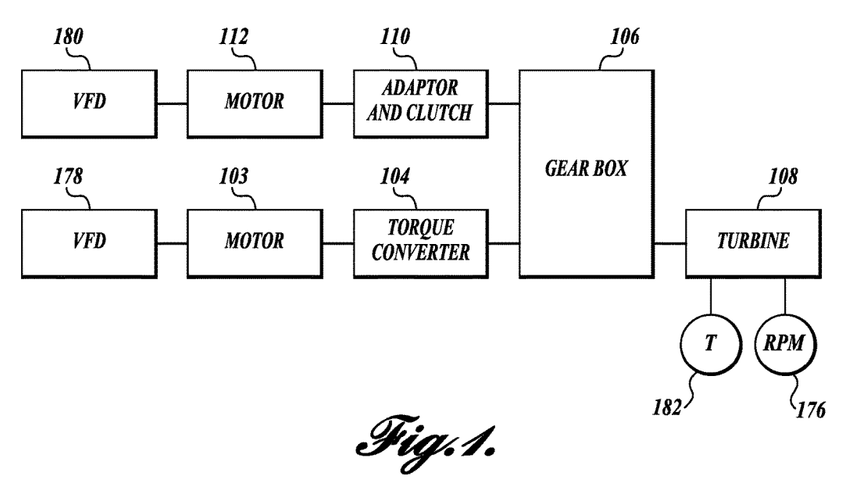
FIG. 1 is a schematic illustration of a modified turbine system having an original turning gear and a slow turning gear.

Referring to FIG. 1, a schematic diagram of a modified turbine is illustrated. It is to be appreciated that turbines include many more systems and instruments than shown in FIG. 1. The simplified schematic is to illustrate a modification of existing turbines. Turbines that use turning gears are generally the heavy industrial kind, but, the size of the turbine is not a limitation. The type of the turbine is also not particularly limited. In some embodiments, the modification applies to turbines that have a turning gear, more particularly this is referred to as an "original" turning gear in this disclosure to be distinguish from a slower turning "slow" turning gear. The original and slow turning gears can also be referred to as the first and second turning gears.

The modified turbine includes an original (first) turning gear and a slow (second) turning gear. Generally, the original turning gear is for turning the turbine in the range of 40 RPM or greater. The slow turning gear is for turning the turbine in the range of less than 10 RPM. In some embodiments, the slow turning gear can turn the turbine in the range of less than 5 RPM. In some embodiments, the slow turning gear can turn the turbine in the range of less than 3 RPM.

Generally, an unmodified turbine includes the turbine 108, an accessory gear box 106, a torque converter 104 attached to the No. 1 shaft of the accessory gear box 106, and a main motor 103 attached to the torque converter 104. The unmodified turbine and its parts are well-known. The No. 1 shaft is the shaft connected to the main rotor of the turbine. Thus, the No. 1 shaft is the drive shaft for the turbine 108. The accessory gear box 106 includes the No. 1 shaft and one or more shafts that are driven by the No. 1 shaft. The additional shafts may be used to turn lubricating oil pumps, fuel pumps, or other systems of the turbine. In some embodiments, the accessory gear box includes a No. 2 shaft that is driven by the No. 1 shaft. In some embodiments, the No. 2 shaft is driven by the No. 1 shaft through one or more intermeshing gears.

In a modified turbine system in accordance with this disclosure, the turbine system further includes a slow turning gear adapter and clutch 110 connected to the No. 2 shaft of the accessory gear box 106, an auxiliary motor 112 connected to the slow turning gear adapter and clutch and the No. 2 shaft. Optionally, the No. 1 and No. 2 shafts may further be modified to include an additional helical gear as further described. As used herein, the No. 1 shaft is the primary shaft used to provide power to the turbine from the main motor 103, and is therefore, the main drive shaft of the turbine 108. In an unmodified turbine, the No. 2 shaft is a follower shaft and is driven by the No. 1 shaft. Thus, in an unmodified turbine, the No. 2 shaft is not a drive shaft of the turbine at any time in the operation of the turbine. In some embodiments of the modified turbine 108, power transmission can be switched back and forth between the No. 1 shaft and the No. 2 shaft based on the turbine RPMS, for example. Accordingly, in the modified turbine, the No. 2 shaft is sometimes used as a drive shaft of the turbine 108 that leads to further advantages. When the auxiliary motor 112 is run, power is transmitted to the No. 2 shaft through the slow turning gear adapter and clutch 110 to turn the turbine at a lower RPM compared to the main motor 103.

The main and auxiliary motors 103, 112 include the variable frequency drive (VFD) 178 and 180, respectively. A VFD is a device that can vary the speed of an AC motor. The VFDs can be used to send a start and stop signal to the respective motors. The motor start signals can include a manual start, such as turning a manual switch. The motor start signals can include an instrument start. Instruments that may be used to determine when to start or stop the main motor 103 and the auxiliary motor 112 include clocks, turbine RPM sensors, turbine temperature sensors, turbine vibration sensors, and the like. Additionally, the VFDs 178 and 180 can be used to control the turbine RPMs. The turbine system may include a host of other instruments for the turbine, the accessory gear box, the torque converter and the two motors. For example, vibration sensors can be placed to detect vibrations on the No. 1 and No. 2 shafts' radial and thrust bearings. Vibration sensors can be placed on the motors themselves. Temperature sensors can be placed to measure temperatures of the accessory gear box, and the No. 1 and No. 2 shafts. Temperature sensors can be placed on the motors themselves.

An RPM sensor 176 senses the speed of the turbine 108. One or more RPM sensors can be used in case of failure of one sensor. The RPM sensor 176 can send a signal indicating the turbine RPMs to the main motor 178 and the auxiliary motor 180. In either case, the RPM signal can be processed by the VFD. Further, the VFD can be programmed to maintain an RPM using the RPM sensor 176. The RPM sensor 176 can be used to determine when the main motor 178 is turned on or off. The RPM sensor 176 can be used to determine when the auxiliary motor 112 is turned on or off.

A temperature sensor 182 senses the temperature of the turbine 108. One or more temperature sensor can be used to sense the temperature of the turbine at various locations. The temperature sensor 182 can send a signal to the VFD 178 and the VFD 180. The temperature sensor 182 can be used to indicate when the main motor 103 is to be turned on or off. The temperature sensor 182 can be used to indicate when the auxiliary motor 112 is to be turned on or off.

Figure 2:
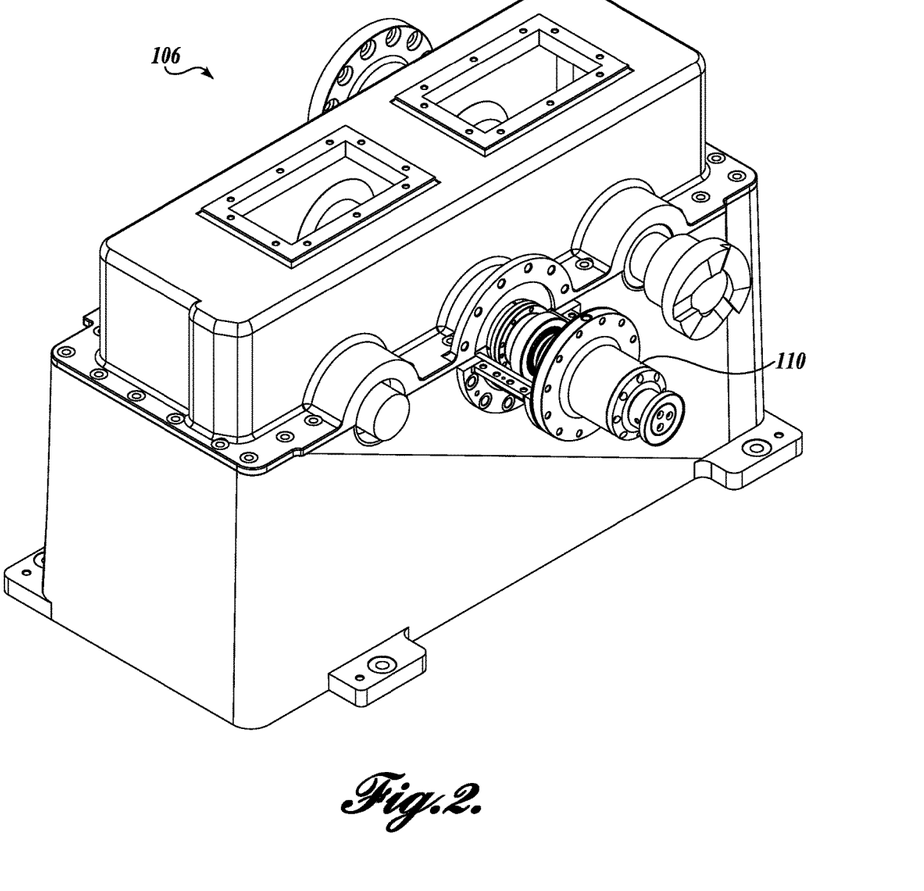
FIG. 2 is an illustration of a modified accessory gear box having a slow turning gear adapter and clutch.

FIG. 2 is a diagrammatical illustration of an accessory gear box 106 showing the slow turning gear adapter and clutch 110 installed on the end of the No. 2 shaft. In FIG. 2, the No. 2 shaft is the middle shaft and the No. 1 shaft is the outer shaft. However, in some embodiments, the No. 1 and No. 2 shafts can be in reversed positions. The No. 1 shaft is defined by connection to the main motor 103 through the torque converter 104, and the No. 2 shaft is defined by connection to the auxiliary motor 112 through the slow turning gear adapter and clutch 110. By connecting the No. 2 shaft to the slow turning gear adapter 110, which in turn is connected to the auxiliary motor 112, the No. 2 shaft at times becomes the drive shaft and the No. 1 shaft is a follower shaft which is driven by the No. 2 shaft. Thus, when the original turning gear and main motor 103 are off, the auxiliary motor 112 can be used to turn the turbine shaft and wheels at a much lower RPM than the main motor 103, which in turn leads to a reduction in bucket rocking, but also maintains the wheels balanced to allow a quick re-start of the turbine.

Figure 3:
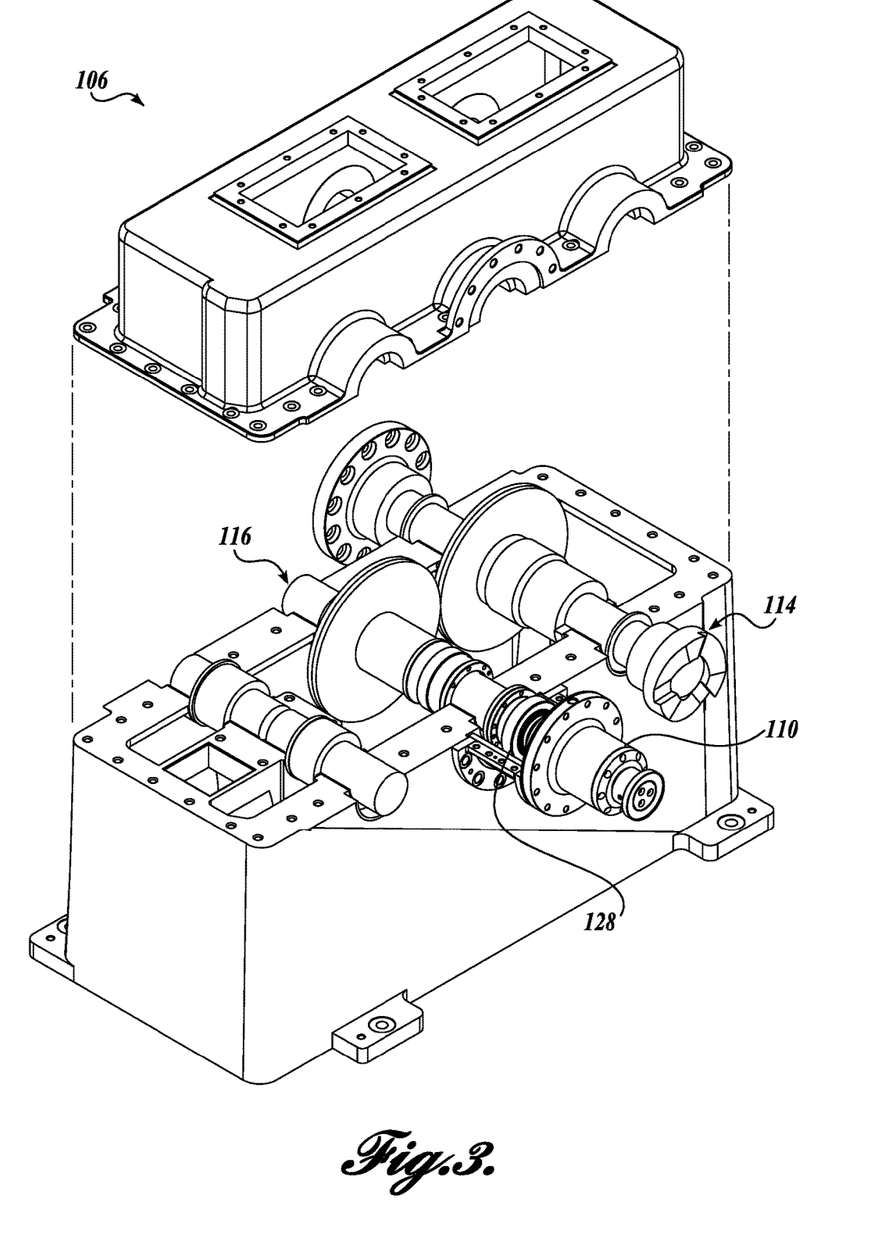
FIG. 3 is an illustration of a modified accessory gear box with the cover removed showing modified gears.

FIG. 3 is a diagrammatical illustration of the accessory gear box 106 with the top cover removed. The accessory gear box 106 contains the No. 1 shaft 114 and the No. 2 shaft 116 having the slow turning gear adapter 110 and clutch 128 attached to the No. 2 shaft. Also shown are the two helical gears 120, 122 on the No. 1 shaft and the two helical gears on the No. 124, 126 on the No. 2 shaft. In cases, where the unmodified turbine includes only a single helical gear on the No. 1 shaft and No. 2 shaft, it may be advantageous to add a second helical gear on the No. 1 and No. 2 shafts to reduce axial thrust on the No. 2 shaft.

Figure 4:
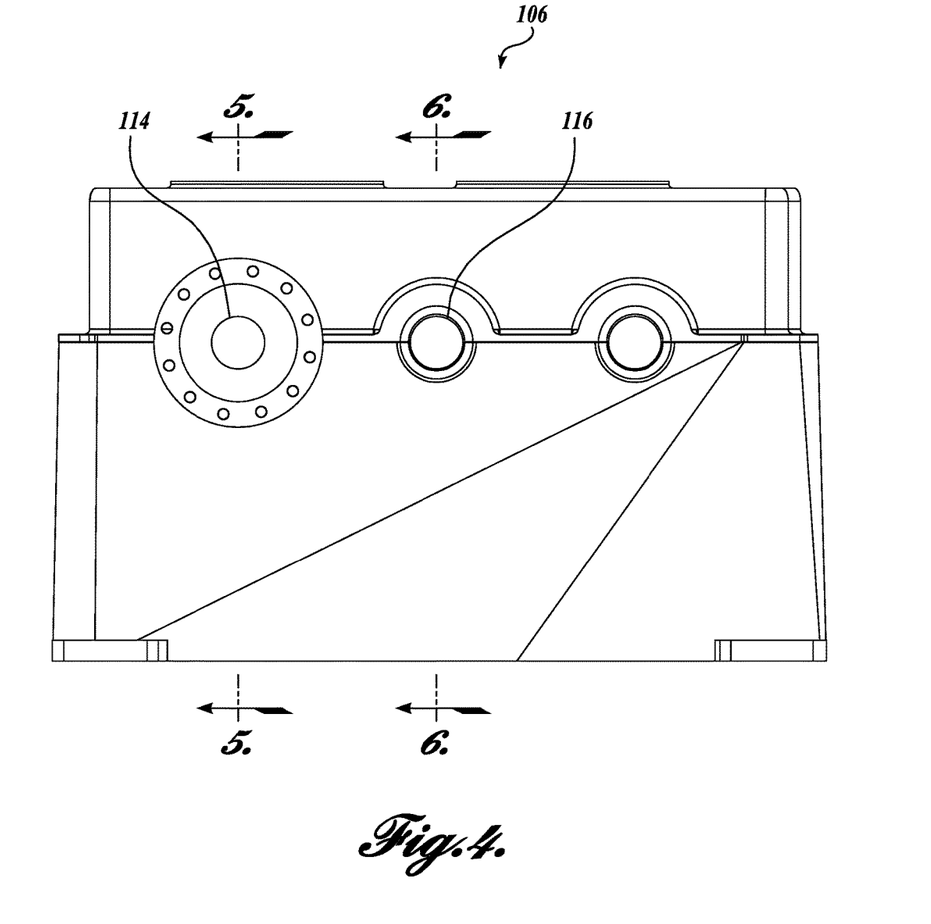
FIG. 4 is an illustration of the accessory gear box as seen from the turbine side.

FIG. 4 is a diagrammatical illustration of the accessory gear box 106 showing the relative positions of the No. 1 shaft 114 and the No. 2 shaft 116 from the turbine side. In a turbine system, the No. 1 shaft 114 is directly connected to the turbine shaft.

Figure 5:
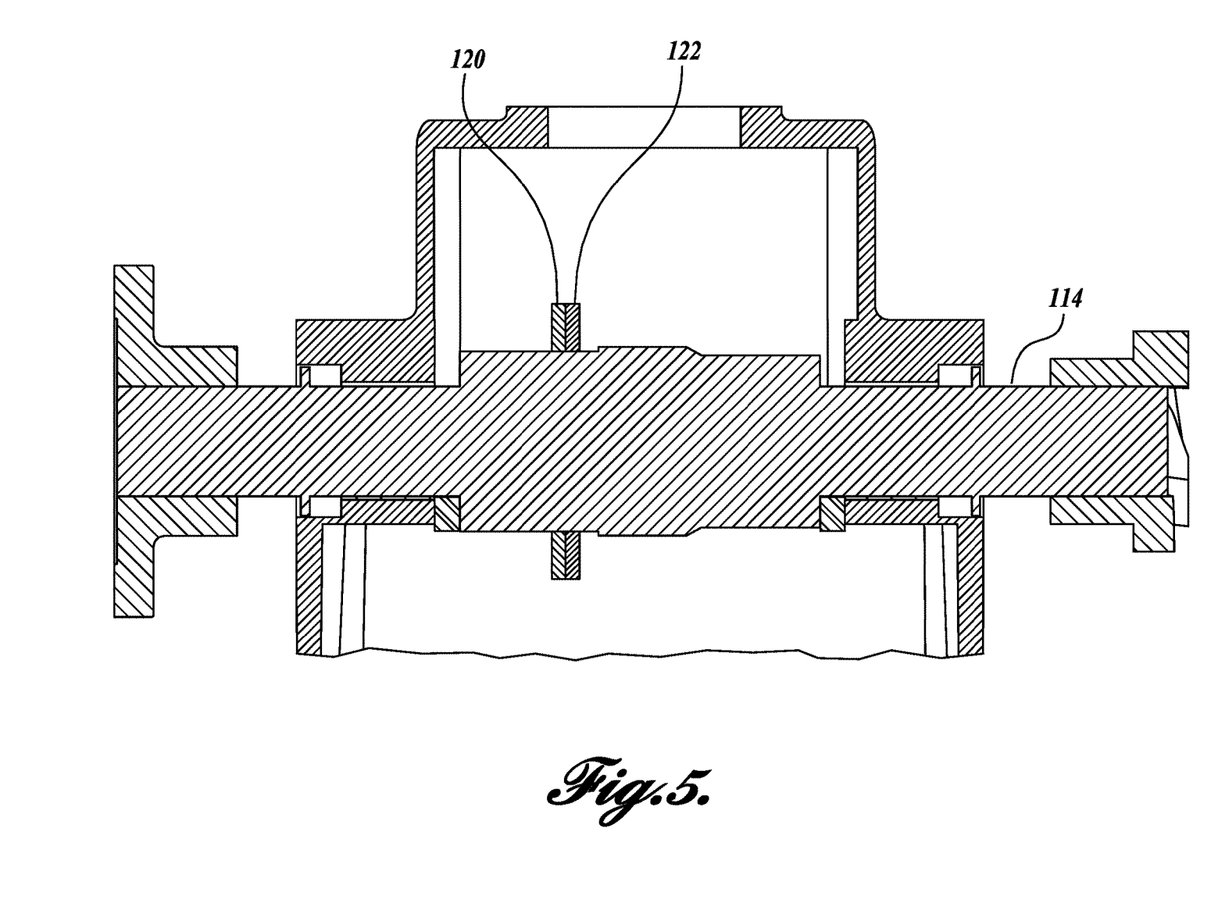
FIG. 5 is an illustration of a cross section of the modified No. 1 shaft of the accessory gear box.

FIG. 5 is a diagrammatical cross-sectional illustration of the No. 1 shaft 114 showing where an additional helical gear 122 may be added juxtaposed next to the original helical gear 120.

Figure 6:
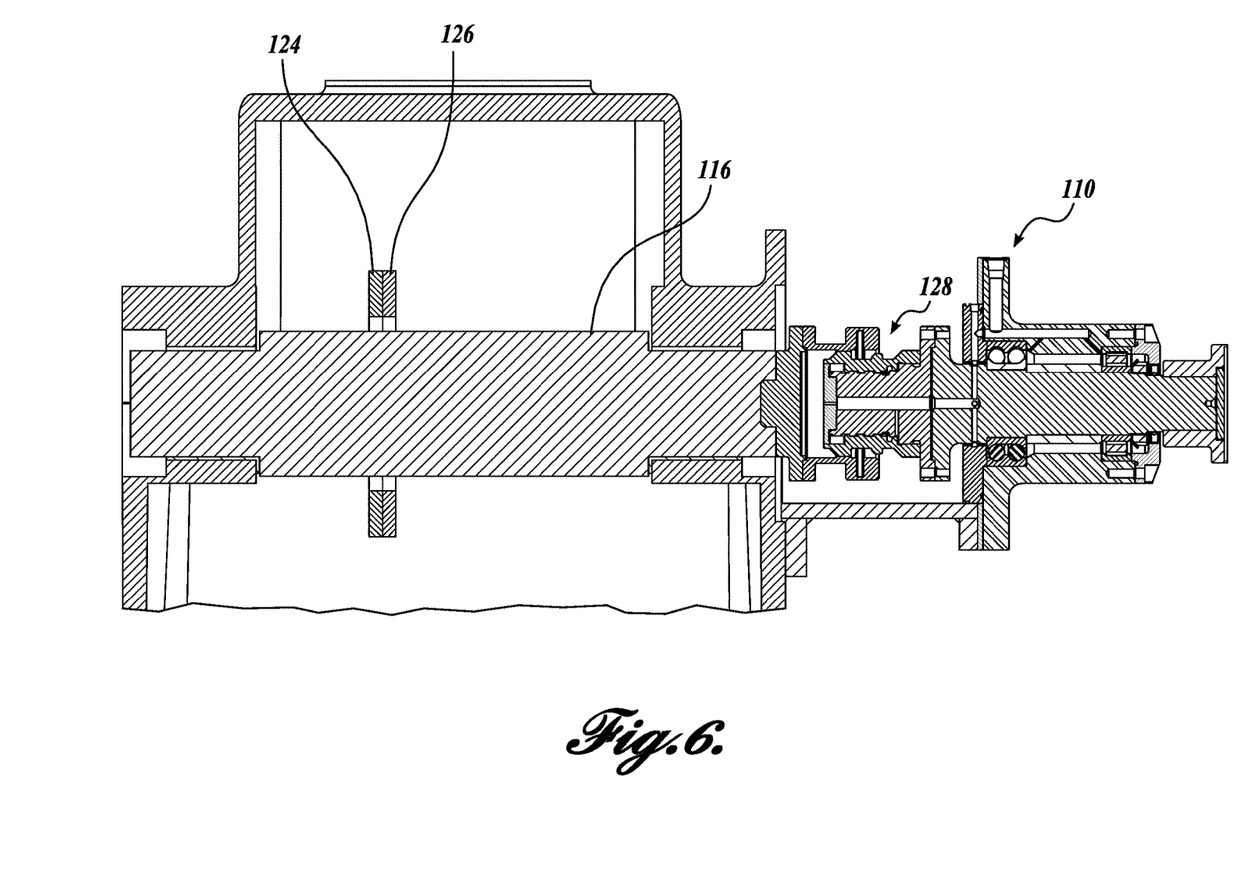
FIG. 6 is an illustration of a cross section of the modified No. 2 shaft of the accessory gear box.

FIG. 6 is a diagrammatical cross-sectional illustration of the No. 2 shaft 116 showing the slow turning gear adapter 110 connected to the end of the No. 2 shaft 116. Also shown is the second helical gear 126, which is added juxtaposed next to the original helical gear 124. The slow turning gear adapter 110 is connected to the No. 2 shaft 116 via the clutch 128. The clutch 128 can be any clutch that can engage at a predetermined RPM, and then disengage at a predetermined RPM. Preferably, the clutch 128 is a clutch manufactured by SSS. As can be seen in FIG. 1, the slow turning gear adapter and clutch 110 are connected to the auxiliary motor 112. Specifically, the clutch 128 is attached to the end of the No. 2 shaft in any known manner, and the clutch 128 is attached to the slow turning gear adapter 110 shaft. In some embodiments, the auxiliary motor 112 can be a 5 to 10 HP alternating current (AC) motor. In any case, the auxiliary motor 112 is sized according to the size of the turbine to provide sufficient torque to turn at the rate of about less than 45 RPM, or less than 25 RPM, or less than 10 RPM, or less than 5 RPM, or less than 3 RPM.

Figure 7:
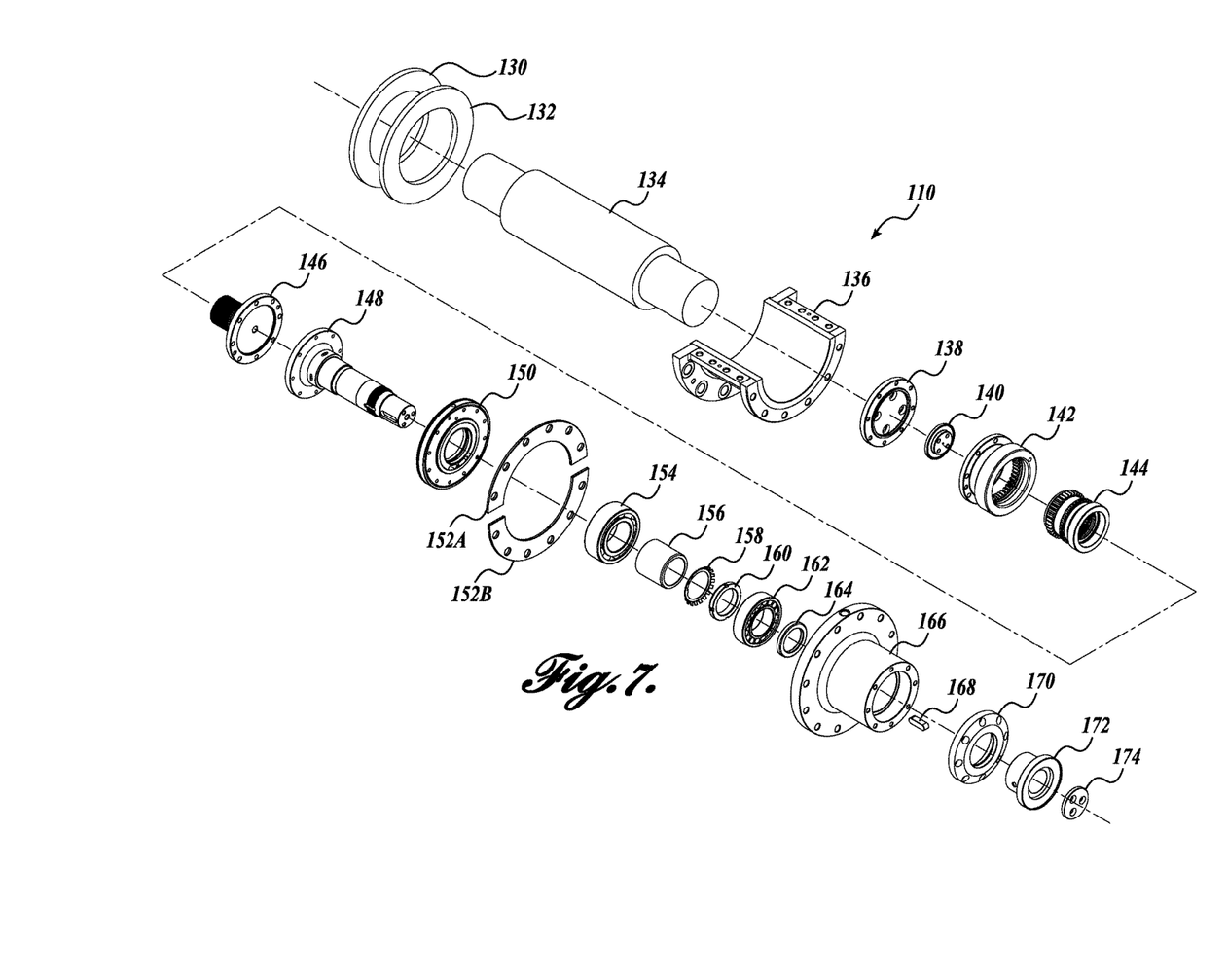
FIG. 7 is an illustration of an exploded view of the modified No. 2 shaft of the accessory gear box.

Referring to FIG. 7, one embodiment of the slow turning gear adapter 110 is illustrated. It should be appreciated that other embodiments may use different parts and have fewer or more parts depending on the specifics of the turbine, the auxiliary motor, or the accessory gear box. One embodiment is illustrated for understanding of making the slow turning gear adapter 110. The following is a listing of the parts of the slow turning gear adapter 110 for one embodiment.

| Reference No. | Description |
| --- | --- |
| 130, 132 | gear spacers |
| 134 | No. 2 shaft |
| 136 | slow turning gear adapter shaft |
| 138 | stub shaft |
| 140 | 3060 drive stop |
| 142 | 3060 output |
| 144 | 3060 drive gear |
| 146 | 3060 input |
| 148 | spindle input shaft |
| 150 | oil feed collar |
| 152a, 152b | shims |
| 154 | angular double row bearing |
| 156 | bearing spacer |
| 158 | lock ring |
| 160 | lock nut |
| 162 | ECG roller |
| 164 | spacer |
| 166 | spindle cartridge housing |
| 168 | input drive key |
| 170 | spindle cartridge seal cover |
| 172 | input drive seal |
| 174 | drive hub retainer |

Figure 8:
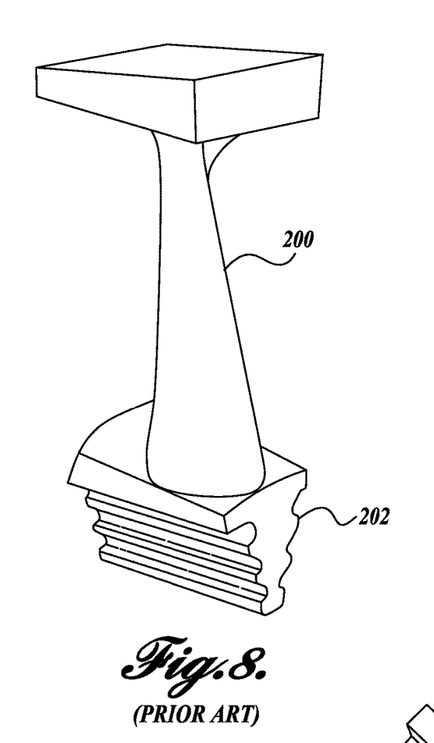
FIG. 8 is an illustration of a conventional turbine bucket showing the root.

Referring to FIG. 8, a diagrammatical illustration of a turbine bucket is illustrated. A turbine bucket includes a bucket 200 and the bucket root 202 in the shape of a fir tree. The fir tree root 202 fits into a similarly profiled aperture on a turbine wheel. In the embodiment shown, the bucket root 202 has a "fir-tree" design, though other designs are known. At original turning gear speeds, there is a rocking motion of the fir tree root within the wheel that causes premature wear of the fir tree root 202 or the wheel. An advantage of turning the turbine wheel at lower RPMs than the original turning gear RPMs is the reduction in wear of the turbine buckets, specifically at the bucket root 202. The turbine wheel dovetails can become sacrificial due to the harder bucket material. Furthermore, the slow turning gear can be left in operation indefinitely or at least longer than the original turning gear. Therefore, when operating with the slow turning gear adapter 110, the turbine can be started up more quickly compared to a dead stop.

Figure 9:
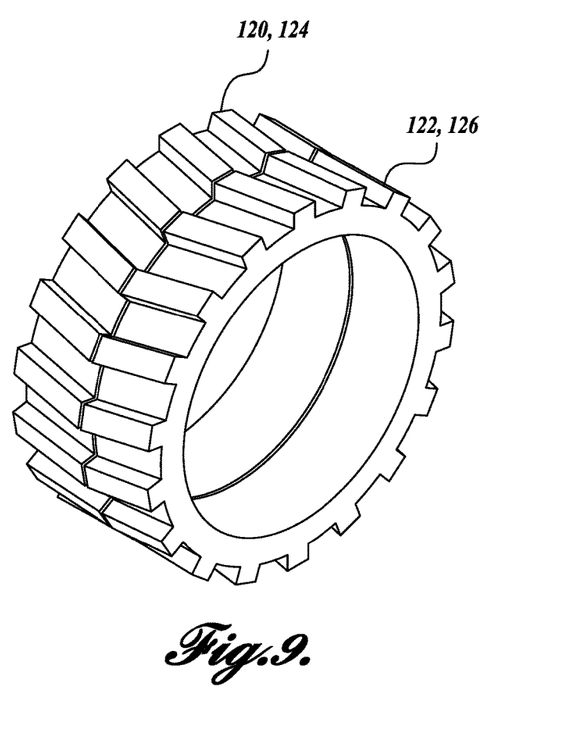
FIG. 9 is an illustration of one embodiment of a double helical gear set.

FIG. 9 is a diagrammatical illustration of a pair of helical gears. The helical gears may be provided as a set; however, in some embodiments, an original helical gear on the No. 1 shaft and on the No. 2 shaft are supplemented with a second helical gear juxtaposed next to the original gear. In some embodiments, a second helical gear is added which is juxtaposed next to the helical gear on the No. 1 shaft and on the helical gear on the No. 2 shaft as shown in FIGS. 5 and 6. The advantage of adding an additional helical gear to the No. 1 shaft and the No. 2 shaft is to remove or reduce axial thrust forces on the No. 2 shaft by transferring the axial thrust through the helical gears to the No. 1 shaft.

Figure 10:
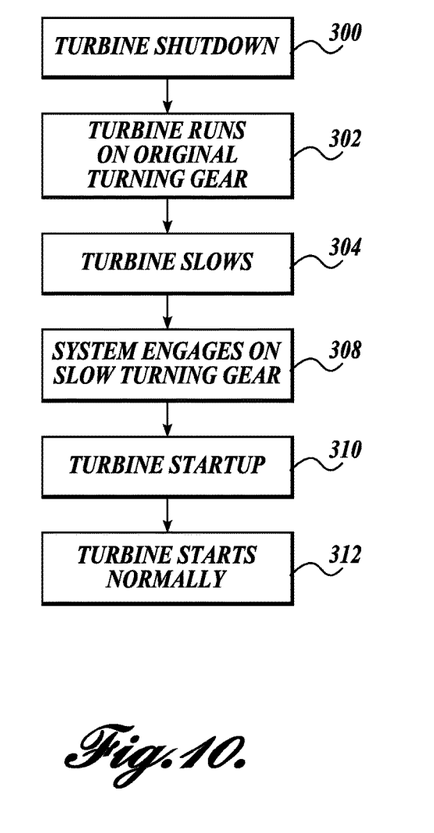
FIG. 10 is flow diagram of a method of using an original turning gear and a slow turning gear.

Referring to FIG. 10, a method of operating a modified turbine, such as in FIG. 1, having an original turning gear and a slow turning gear is illustrated.

In step 200, a turbine 108 is shutdown following the normal procedures for the turbine and then the turbine is put on the original turning gear. In step 302, the turbine 108 is running on the original turning gear using the main motor 103. Each turbine may have a program that adjusts the RPM of the main motor 103 according to the measured temperature of turbine. Additionally, or alternatively, the program may take into consideration the time from when the original turning gear is engaged. In step 304, the slow turning gear is started running by turning on the auxiliary motor 112. The auxiliary motor 112 receives a signal to start. The start signal may be triggered manually. Alternatively, the start trigger may be based on a certain temperature or RPM of the turbine or by a clock counting the time from a trigger. When the auxiliary motor 112 is first started, preferably the turbine 108 RPMs are still above the clutch engage setpoint. Therefore, the clutch 128 is disengaged, and the No. 2 shaft continues being driven by the No. 1 shaft. Thereafter, the original turning gear and main motor 103 can be stopped or left running. If stopped, the signal to stop the main motor 103 can be done manually. Alternatively, the signal to stop the main motor 103 can be triggered by a clock or a temperature indicating the turbine has cooled sufficiently. As the turbine 108 speed decreases, the clutch 128 will engage the No. 2 shaft at the predetermined RPM so that power from the auxiliary motor 112 is transferred through the slow turning gear adapter 110 to the No. 2 shaft, and the No. 2 shaft now drives the No. 1 shaft and the turbine. Preferably, the clutch engages at 10 RPM or less. More preferably, the clutch engages at less than 7 RPM and most preferably, the clutch engages below 5 RPM. As used herein, the RPM is a measure of the turbine shaft speed. In step 308, the turbine can remain in step 308 for an indefinite period of time. The turbine 108 can run indefinitely on the slow turning gear 110 and auxiliary motor 112 using the No. 2 shaft as the drive shaft. Running on low RPMs reduces the bucket rocking and reduces the bucket wear at the bucket root compared to the wear that would be occurring under the original turning gear speed. Further, because the turbine is kept turning, the wheels do not bow, and the turbine is ready to start more quickly compared to a dead stop. In step 310, the turbine can undergo normal start up to speed up the turbine including using the main motor 103. In step 312, once the turbine reaches the predetermined RPM setpoint, the clutch 128 is disengaged stopping the power transmission from the auxiliary motor 112 to the No. 2 shaft and switching power transmission to the No. 1 shaft from the main motor 103. The disengage speed for the clutch 128 can be the same or different from the clutch engage speed. Once the power from the auxiliary motor 112 is taken off the No. 2 shaft, the turbine 108 will continue the start-up process as normal using the main motor 103 and the No. 1 shaft for power transmission.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A method of operating a turbine when taking the turbine off-line, comprising:
    transmitting power to a No. 1 shaft via a main motor to turn the turbine at an original turning speed, wherein the No. 1 shaft drives a No. 2 shaft;
    reducing a speed of the turbine; and
    when the speed of the turbine is reduced to a predetermined RPM, and upon reaching a predetermined time of running the turbine at the original turning speed, switching power transmission to the turbine from the No. 1 shaft to the No. 2 shaft, wherein the No. 2 shaft is driven by an auxiliary motor, and the No. 2 shaft drives the No. 1 shaft to turn the turbine at a slow turning speed less than the original turning speed, wherein the turbine comprises turbine buckets attached by bucket roots on a turbine wheel.

2. The method of claim 1, wherein the original turning speed is greater than 40 RPM, and the slow turning gear speed is less than 10 RPM.

3. The method of claim 1, wherein the original turning speed is used during cool down of a turbine shaft, and the slow turning speed is used after the turbine shaft has cooled down.

4. The method of claim 1, further comprising engaging a clutch to transmit power from the auxiliary motor to the No. 2 shaft.

5. The method of claim 4, further comprising turning off the main motor to reduce the turbine speed before the clutch is engaged.

6. The method of claim 1, further comprising, after the turbine has been running at the slow turning speed, increasing the speed of the turbine, and when the speed of the turbine is increased to a predetermined RPM, switching power transmission to the turbine from the No. 2 shaft to the No. 1 shaft.

7. The method of claim 6, further comprising disengaging a clutch upon reaching the predetermined RPM.

8. The method of claim 6, further comprising turning on the main motor to increase the speed of the turbine.

9. The method of claim 1, wherein the No. 1 shaft and the No. 2 shaft are located within an accessory gear box.

10. The method of claim 1, wherein the No. 1 shaft comprises a set of helical gears and the No. 2 shaft comprises a set of helical gears, wherein the helical gears of the No. 1 shaft are intermeshed with the helical gears of the No. 2 shaft.

11. A method of operating a turbine when taking the turbine off-line, comprising:
    transmitting power to a No. 1 shaft via a main motor to turn the turbine at an original turning speed, wherein the No. 1 shaft drives a No. 2 shaft;
    reducing a speed of the turbine; and
    when the speed of the turbine is reduced to a predetermined RPM, and upon reaching a predetermined turbine temperature while running the turbine at the original turning speed, switching power transmission to the turbine from the No. 1 shaft to the No. 2 shaft, wherein the No. 2 shaft is driven by an auxiliary motor, and the No. 2 shaft drives the No. 1 shaft to turn the turbine at a slow turning speed less than the original turning speed, wherein the turbine comprises turbine buckets attached by bucket roots on a turbine wheel.

12. The method of claim 11, wherein the original turning speed is greater than 40 RPM, and the slow turning gear speed is less than 10 RPM.

13. The method of claim 11, wherein the original turning speed is used during cool down of a turbine shaft, and the slow turning speed is used after the turbine shaft has cooled down.

14. The method of claim 11, further comprising engaging a clutch to transmit power from the auxiliary motor to the No. 2 shaft.

15. The method of claim 14, further comprising turning off the main motor to reduce the turbine speed before the clutch is engaged.

16. The method of claim 11, further comprising, after the turbine has been running at the slow turning speed, increasing the speed of the turbine, and when the speed of the turbine is increased to a predetermined RPM, switching power transmission to the turbine from the No. 2 shaft to the No. 1 shaft.

17. The method of claim 16, further comprising disengaging a clutch upon reaching the predetermined RPM.

18. The method of claim 16, further comprising turning on the main motor to increase the speed of the turbine.

19. The method of claim 11, wherein the No. 1 shaft and the No. 2 shaft are located within an accessory gear box.

20. The method of claim 11, wherein the No. 1 shaft comprises a set of helical gears and the No. 2 shaft comprises a set of helical gears, wherein the helical gears of the No. 1 shaft are intermeshed with the helical gears of the No. 2 shaft.

21. A method of operating a turbine when taking the turbine off-line, comprising:
    transmitting power to a No. 1 shaft via a main motor to turn the turbine at an original turning speed, wherein the No. 1 shaft drives a No. 2 shaft;
    reducing a speed of the turbine; and
    when the speed of the turbine is reduced to a predetermined RPM, switching power transmission to the turbine from the No. 1 shaft to the No. 2 shaft, wherein the No. 2 shaft is driven by an auxiliary motor, and the No. 2 shaft drives the No. 1 shaft to turn the turbine at a slow turning speed less than the original turning speed, and upon reaching a predetermined time of running the turbine at the original turning speed or upon reaching a predetermined turbine temperature while running the turbine at the original turning speed, switching power transmission from the No. 1 shaft to the No. 2 shaft.

\* \* \* \* \*